United States Patent [19]

Chaney, Sr.

[11] Patent Number: 4,669,173

[45] Date of Patent: Jun. 2, 1987

[54] APPARATUS FOR AND METHOD OF INTERCHANGEABLY MOUNTING FOR IMMEDIATE USE ANY ONE OF A PLURALITY OF BENCH TOOLS AT A WORK STATION

[76] Inventor: James C. Chaney, Sr., Rte. 1, Box 650, Cantonment, Fla. 32533

[21] Appl. No.: 766,497

[22] Filed: Aug. 19, 1985

[51] Int. Cl.[4] ......................... B23P 19/00; B25H 1/00

[52] U.S. Cl. .................................... 29/526 R; 83/574; 144/1 G; 144/286 R; 248/551; 248/1

[58] Field of Search ................ 144/285, 286 R, 286.8, 144/1 R, 1 E, 1 F, 1 G; 248/1 B, 346, 551, 678; 83/698, 574; 29/526 R

[56] References Cited

U.S. PATENT DOCUMENTS

| | | | |
|---|---|---|---|
| 2,171,664 | 9/1939 | McFarland | 248/551 |
| 2,711,298 | 6/1955 | Woods | 144/1 G |
| 2,759,507 | 8/1956 | Davis et al. | 144/285 |
| 2,786,500 | 3/1957 | Unterfranz | 144/285 |
| 3,734,151 | 5/1973 | Skripsky | 144/1 R |
| 4,105,055 | 8/1978 | Brenta | 144/286 R |
| 4,252,239 | 2/1981 | Snyder | 144/285 |
| 4,265,283 | 5/1981 | Nash et al. | 144/286 R |
| 4,350,193 | 9/1982 | McCambridge et al. | 83/574 |

*Primary Examiner*—W. D. Bray

*Attorney, Agent, or Firm*—James B. Lake, Jr.

[57] ABSTRACT

Bench tool mounting apparatus has a single rectangular outer part for fixing to a work bench work station and that defines three interior three-dimensional orthogonally contiguous marginal areas adjacent three outer part sides and center openings on a fourth side. There are also a plurality of inner identical parts, each for having a bench tool fixed thereon and each defining three three-dimensional marginal projections adapted for each to slidably engage in the marginal areas of the single outer part through the center openings thereof and thereby securely mount a bench tool on the work bench. A pair of bolts engage respectively in vertically aligned and spaced-apart bolt holes defined through an inner part marginal projection and an outer part defining an adjacent marginal area to lock the inner and outer parts together. By recessing the fourth opening side of the outer part to engage a fixed facing element of the corresponding fourth side of an inner part, the parts are orthogonally and contiguously engaged around all four sides of the mounting apparatus.

4 Claims, 3 Drawing Figures

APPARATUS FOR AND METHOD OF INTERCHANGEABLY MOUNTING FOR IMMEDIATE USE ANY ONE OF A PLURALITY OF BENCH TOOLS AT A WORK STATION

BACKGROUND OF THE INVENTION

The invention relates generally to the mounting and use of bench tools, and more particularly to apparatus for and method of interchangeably mounting for immediate use any one of a pluarality of bench tools at a work station.

In a small work shop, space is always at a premium, and providing the necessary bench tools for immediate use in the restricted space is a common problem. Heretofore the solution has been to use portable power tools, each having a combination carrying case and tool mount, as taught by the prior art in U.S. patents to Davis et al U.S. Pat. No. 2,759,507; to Snyder U.S. Pat. No. 4,252,239; and to Unterfranz U.S. Pat. No. 2,786,500. By setting up each portable tool as needed, work space was saved but at the expense of increased storage space, proximity of tools to work station was sacrificed, required time for assembly and disassembly was prohibitive. In another solution U.S. patents to McCambridge et al U.S. Pat. No. 4,350,193 and to Nash et al U.S. Pat. No. 4,265,283 provide work tables for making portable tools into table mounted tools, McCambridge at one work station and Nash at three. In both cases the claims centered on providing means for mounting portable tools on the under surface of a work table top without having to turn the table over or get under it.

The present invention teaches apparatus comprising a mounting device having a single outer part that is permanently built into, or fixed to, a work bench and a plurality of inner parts similar to each other and each of which is fixed to a separate bench tool, the outer part being adapted to lockably engage with and disengage from each of the inner parts. The invention also teaches a method of mounting bench tools for use in a time range of 15 to 20 seconds.

SUMMARY OF THE INVENTION

It is an object of the invention to provide an intermediate mounting device between a single work station of a work bench and each of a plurality of bench tools for immediately engaging and disengaging said respective bench tools to and from said work station.

Another object of the invention is to provide a mounting device having an outer part and a plurality of inner parts that one at a time are slidably lockable in said single part, said plurality of inner parts being permanently fixable to respective bench tools, and said outer part being permanently built in or fixable to said work station.

DETAILED DESCRIPTION OF THE PREFERRED EMBODIMENTS

Figure 1:
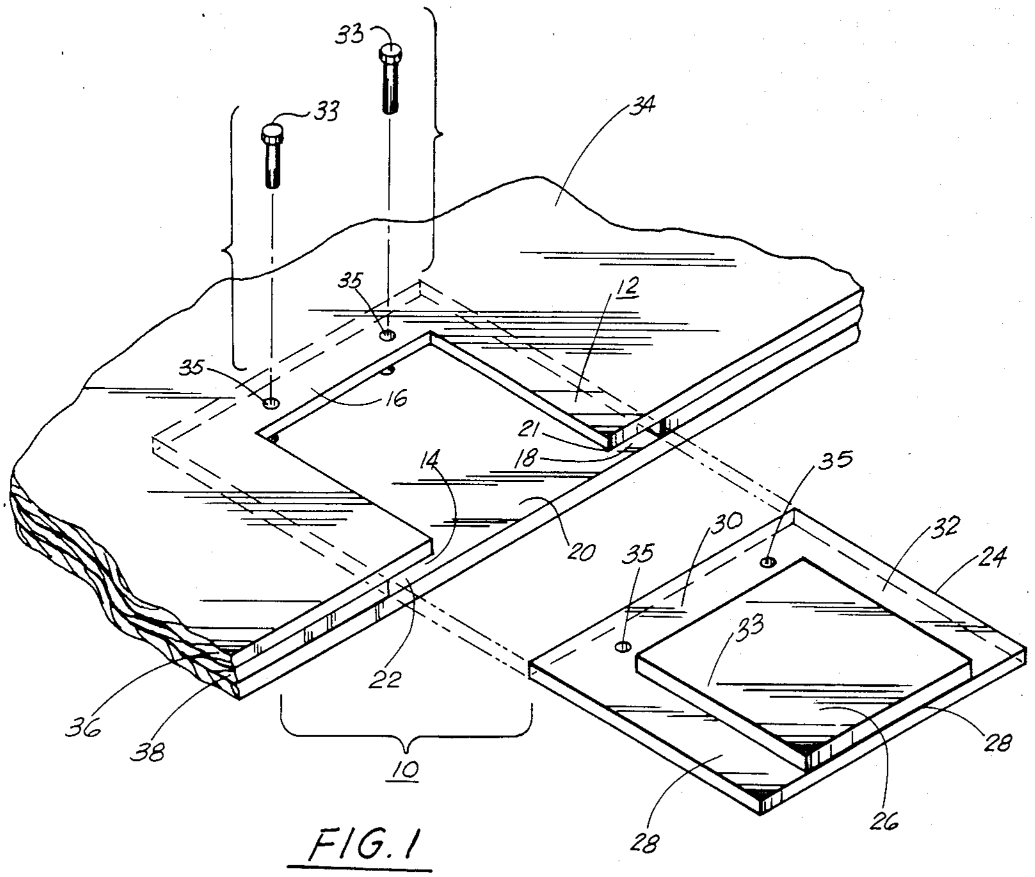
FIG. 1 is a three dimensional exploded view from above of the invention showing an outer part built into a partially shown work bench top, and one of said inner parts in engaging alignment therewith.
Figure 2:
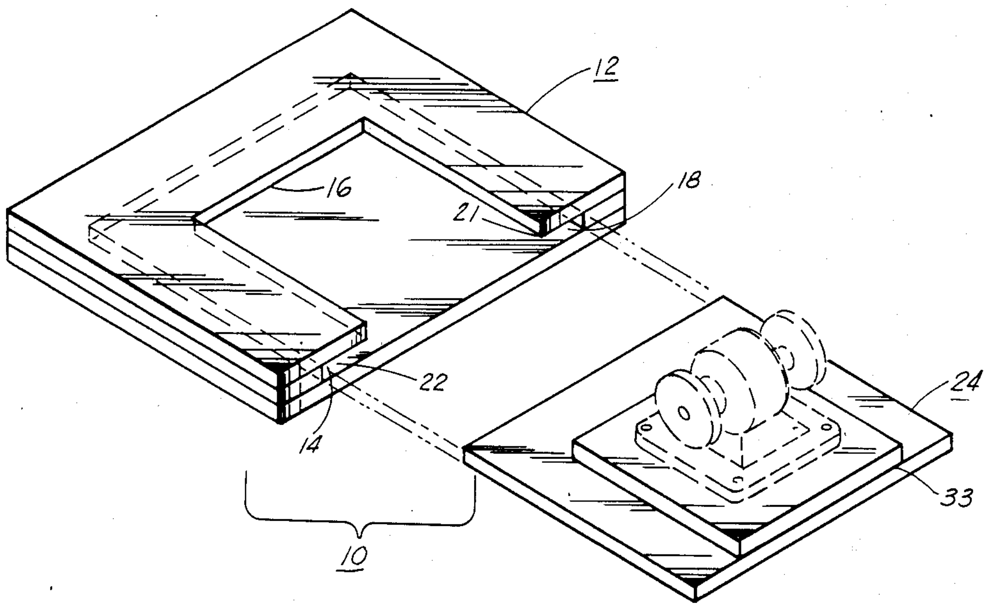
FIG. 2 is similar to FIG. 1 showing an outer part as an entity, and said inner part with a bench tool fixed thereon.
Figure 3:
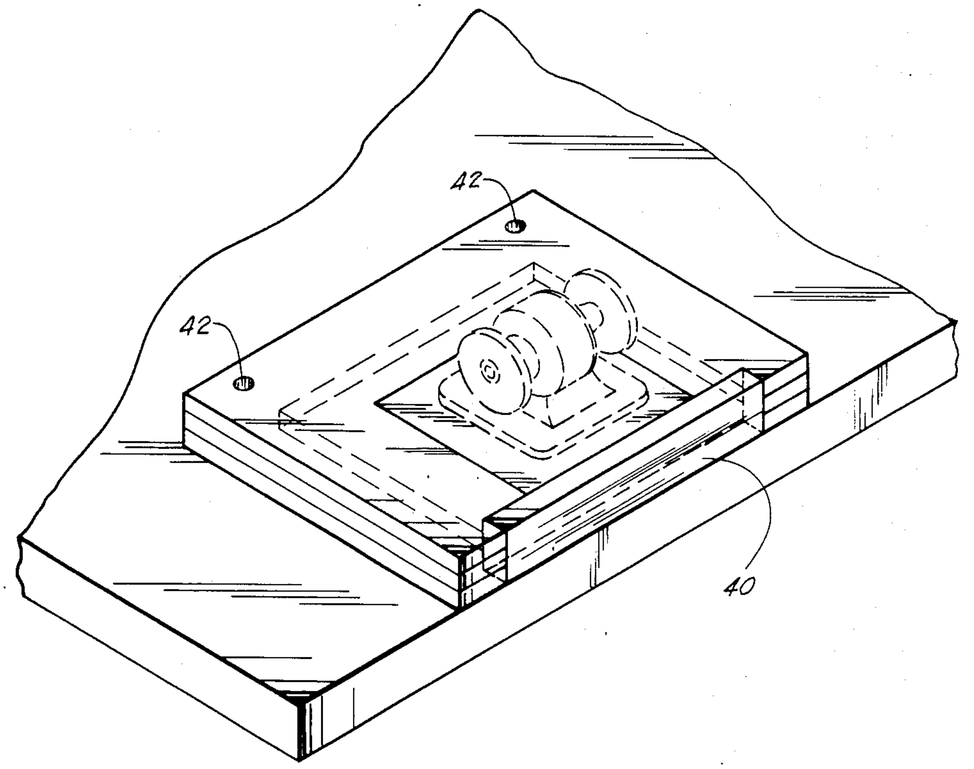
FIG. 3 is a three dimensional view from above showing outer part recessed on an open side, and a facing element fixed to an unengaged side of said inner part for contiguous sliding engagement on all four sides of both said parts.

Referring to FIGS. 1–3, the invention comprises a rectangular mounting device 10, having an outer part 12 defining three interior three-dimensional marginal spaces 14, 16, and 18 that are orthogonally contiguous and adjacent three contiguous sides of said outer part, and on the fourth side 20 integral center opening 21 and 22 that respectively exclude and include said marginal spaces. A plurality of inner parts 24 are similar to each other and each comprises a rectangular center structure 26, adapted to fit into opening 21, superimposed upon and fixed to a center structure 28 adapted to fit into opening 22 and define marginal projections 28, 30 and 32 adapted to fit and engage in marginal spaces 14, 16, and 18 are three sides of said inner part, the fourth sides of said structures 26 and 28 being flush with each other and side 20 of said outer part 12. When slidably engaged, the parts 12 and 24 are prevented from disengaging by pin bolts 33 engaging in pin bolt holes 35 extending through the parts of part 12 defining marginal area 16, and marginal projection 30 of inner part 24.

In an another embodiment, the outer part 12 can be constructed as a part of a work bench 34 as illustrated in FIG. 1 by adding extra thicknesses of table top 36 and 38 that define center openings 21 and 22 and the marginal spaces as previously described. When not built in as part of a work bench, part 12 of the invention can be bolted, or otherwise conveniently fixed to or rabbetted in (not shown) a work bench.

As illustrated in FIGS. 1–3, the single outer part 12 and any one of the plurality of inner parts 24 are slidably engageable on three contiguously orthogonal sides. By recessing the fourth side 20 of part 12 to receive a vertical facing element 40 (see FIG. 3), and extending marginal space 16 oppositely and equally to the recess, and fixing said facing element to the fourth side of inner part 24, the parts of the invention are engageable slidably on all four sides, three dimensionally on three sides and two dimensionally on the remaining side. The embodiments shown in FIGS. 2 and 3 are fixed to a work station by bolting said outer part thereto through bolt holes 42.

What is claimed is:

1. Apparatus for interchangeably mounting for immediate use any of a plurality of bench tools at a work station, comprising:

(a) a rectangular outer part defining three interior three-dimensional orthogonally contiguous marginal spaces respectively adjacent three sides of said rectangular outer part, and defining center and top openings respectively into and adjoining said marginal spaces from the fourth side, for fixing said outer part to said work bench and station adjoining an edge thereof;

(b) a plurality of identical inner parts for respectively mounting a respective one of said plurality of bench tools, each said inner part defining three-dimensional marginal projections adapted to slidably engage in and disengage from said three dimensional orthogonally contiguous spaces through said side and top center openings and thereby mount a said respective bench tool on said work bench and station; and (c) pin bolt means adapted to engage in respective pin bolt holes defined vertically aligned and spaced horizontally apart through a respective one of said marginal projections and through a part of said outer part defining a marginal space adjacent said respective projection, for locking said outer and one of said inner parts together against sliding disengagement.

2. Apparatus as described in claim 1 wherein said outerpart is built into the top of said work bench and station from a side and as a part of said top.

3. Apparatus as described in claim 1 wherein said outer part's open side is recessed to slidably engage a vertical element fixed to the fourth side of an inner part, thereby engaging said inner part to said outer part orthogonally contiguous on all four sides respectively.

4. A method of interchangebly mounting for immediate use one of a plurality of bench tools at a work station comprising the steps of:

(a) fixing a rectangular outer part of a mounting device on the top of a work bench station, said outer part defining three three-dimensional and one two dimensional orthogonally contiguous interior marginal spaces and defining center openings by the vertical limits of said marginal spaces;

(b) fixing bench tools respectively to the top of of each of a plurality of mounting devices inner parts, each of said plurality defining marginal projections dimensioned and positioned to conform to and with said outer part marginal spaces;

(c) slidably engaging through said edge and center openings the marginal projections of any one of said inner part in the marginal spaces of said outer part, thereby mounting said bench tool on said work bench station; and (d) locking said inner and outer parts together with pin bolts passing through a pair of adjoining marginal projections and structure defining a marginal space against possible sliding disengagement.

* * * * *